United States Patent [19]

Pöhler et al.

[11] Patent Number: 4,858,240
[45] Date of Patent: * Aug. 15, 1989

[54] ARRANGEMENT FOR THE GENERATION OF $CO_2$ LASER PULSES OF HIGH POWER

[75] Inventors: Manfred Pöhler, Halle-Neustadt; Gisbert Staupendahl; Richard Wittig, both of Halle, all of German Democratic Rep.

[73] Assignee: VEB Kombinat Feinmechanische Werke Halle, Halle, German Democratic Rep.

[*] Notice: The portion of the term of this patent subsequent to Jul. 4, 2006 has been disclaimed.

[21] Appl. No.: 935,379

[22] Filed: Nov. 26, 1986

[30] Foreign Application Priority Data

Jan. 9, 1986 [DD] German Democratic Rep. ............................ 2860700

[51] Int. Cl.$^4$ ................................................ H01S 3/11
[52] U.S. Cl. .................................... 372/10; 372/92; 372/98; 372/99; 372/100
[58] Field of Search ............... 372/10, 100, 99, 55, 372/61, 29–33, 92, 96, 98, 18, 19

[56] References Cited

U.S. PATENT DOCUMENTS 3,803,509  4/1974  Steffen ........................... 331/94.5
4,461,005  7/1984  Ward et al. ....................... 372/10

FOREIGN PATENT DOCUMENTS 2610652   9/1977  Fed. Rep. of Germany .
2913270  10/1980  Fed. Rep. of Germany .
 134415   2/1979  German Democratic Rep. .
 234208   3/1986  German Democratic Rep. .

OTHER PUBLICATIONS

IEEE Journal of Quantum Electronics, vol. QE-2, No. 8, Aug. 1966, pp. 243–245, 378–381.
Applied Physics Letters, vol. 11, No. 3, Aug. 1967, pp. 88–89.

Primary Examiner—William L. Sikes
Assistant Examiner—B. R. R. Holloway
Attorney, Agent, or Firm—Jordan and Hamburg

[57] ABSTRACT

An arrangement for the generation of $CO_2$ laser pulses of high power. In a first step, the laser medium is brought by an electrical pumping pulse into a state of extremely high population inversion and, in a second step, this inversion is decayed suddenly by a Q-switching effect in such a manner, that radiation pulses of extreme power magnification arise. The power is supplied to the laser-gas discharge by a power-supply unit which permits the pulsed supply of pumping energy. The associated laser resonator is formed from
a first resonator mirror with a fixed reflectivity $R_1$,
frequency-selective element,
a special, highly angle-selective gas discharge tube,
and a special component material transparent to the laser radiation that functions as a second resonator mirror with a variable reflectivity $R_2$. The second unit is comprised of a modulator with a high cutoff frequency in the form of a Fabry-Perot interferometer arrangement with a rapidly changeable optical wavelength.

7 Claims, 2 Drawing Sheets

ARRANGEMENT FOR THE GENERATION OF CO$_2$ LASER PULSES OF HIGH POWER

BACKGROUND OF THE INVENTION

The invention relates to an arrangement for the generation of CO$_2$ laser pulses of high power which, on the one hand, permit material processing tasks to be carried out that require the high power densities at the processing site, such as cutting, welding and engraving or defined material removal, especially in the case of metals with a high degree of reflection for the laser radiation, such as aluminum and copper, and, on the other, make possible the use of relatively small, compact CO$_2$ lasers in applications, such as scribing and defined material removal in electronic and microelectronic technology.

Numerous applications of CO$_2$ laser radiation require power densities which, even with optimal focussing, can only be realized by radiated power far in the kW range. To achieve these powers, the CO$_2$ lasers generally are operated in the pulsed mode in such cases. Aside from generating adequate peak powers, the maximum conversion of the potentially available average power into radiation pulses is aimed for.

Various technical solutions are known for generating high-power CO$_2$ laser pulses.

One possibility of generating CO$_2$ laser radiation pulses is represented by the principle of the transversely excited high-pressure CO$_2$ laser (TEA laser) which, because of the high pressure of the laser gas, permits the realization of exceptionally high pulsed peak powers. Achieving the frequently required high pulse repetition frequencies is, however, very problematical. Frequencies of even a few hundred hertz require an enormous technical effort.

The electrical excitation of pulses of the CO$_2$ laser discharge is the method primarily used industrially to generate intensive radiation pulses for processing materials. This mechanism permits pulse repetition frequencies up to 2.5 kHz with low-pressure CO$_2$ lasers. However, with electrically pulsed gas discharges, the achievable magnification of the peak pulse power relative to the cw (continuous-wave) power is limited to a factor of about 10, since the processes of the build-up of the population inversion by the gas discharge and the decay of the inversion by the oscillation build-up of the laser overlap in time.

This disadvantage is largely avoided by the various methods of Q-switching CO$_2$ lasers, since with these methods a population inversion of maximum amplitude can develop to begin with, which is then converted by the sudden increase in the quality of the laser resonator into a radiation pulse of greatly magnified power. All conventional methods of Q-switching, however, have significant deficiencies with respect to material processing tasks. The main deficiencies are an unfavorable duty ratio of laser on to laser off and thus a considerable loss of average power during active revolving-mirror Q-switching (cf. Flynn, IEEE Journal of Quantum Electronics, vol. QE-2, 378 (1966));

a limitation to periodic pulse sequences or to a fixed pulse repetition frequency, for example, in the case of passive Q-switching (see, for example, Appl. Phys. Lett. 11, 88 (1967);

high costs, for example, when actively switching by means of electro-optical crystals (see, for example, IEE Journal of Quantum Electronics, vol. QE-2, 243 (1966)).

The arrangements, described in the German Offenlegungsschrift 2,610,652 and the German Offenlegungsschrift 2,913,270, represent attempts to combine the advantages of the pulsed supply of pumping energy with the active Q-switching of the laser. Both arrangements are, however, usable only on optically pumped lasers in the visible or near infrared region of the spectrum, where there is the possibility of using the advantageous properties of electrooptical crystals (in contrast to the CO$_2$ laser spectral range of wavelengths between 9 $\mu$m and 11 $\mu$m). By synchronizing the pumped light pulses with the operation of the electro-optical Q-switch, it was possible to achieve advantageous parameters of the laser pulses generated.

OBJECT OF THE INVENTION

It is the object of the invention to provide a CO$_2$ laser for high-power radiation pulses, which ensures the maximum conversion of the energy, which is potentially available and can be stored in the laser medium, into radiation pulses of high power and thus guarantees an advantageous mass to power ratio of the laser, high productivity and consequently relatively low costs for material processing tasks which require high power densities at the processing site, such as cutting, welding and engraving or defined material removal, especially in the case of metals with a high degree of reflection for the laser radiation, or through the optimum utilization of the laser mechanism, enables relatively small and compact CO$_2$ lasers to be used for applications such as engraving and the defined removal of material in the electronics and microelectronics industry.

SUMMARY OF THE INVENTION

The invention is thus directed to the provision of CO$_2$-laser high-power pulses with maximum conversion of the energy, that is potentially available and can be stored in the laser medium, owing to fact that, in a first step, the gas mixture of the low-pressure CO$_2$ laser is brought with the help of a defined electrical pumping pulse into a state of extremely high population inversion and, in a second step, this inversion is decayed suddenly through a special Q-switching effect in such a manner that the radiation pulses arise with an extreme magnification of power.

This object is accomplished in accordance with the invention by the following arrangement and the subsequently described operating routine.

The resonator of the CO$_2$ laser is comprised of
a first resonator mirror with a fixed reflectivity R$_1$;
frequency-selective element;
a special, highly angle-selective gas discharge tube in accordance with DD-WP H 01 S/199 976
and a special component of a material transparent to the laser radiation. This element functions as a second resonator mirror with a variable reflectivity R$_2$ and comprises a Fabry-Perot interferometer with a rapidly changeable optical wavelength, by means of which the ratio of the transmitted to the reflected portion of the incident radiation or of its reflectivity R$_2$ can be varied by appropriate control signals in the interval $0 \leq R_2 \leq R_{max}$, the respective value of R$_2$ being a function of the wave length $\lambda$.

If the high-power CO$_2$ laser, with the help of the frequency-selective element, is forced to operate at a fixed wavelength $\lambda = 10.59$ $\mu$m, which generally is optimum for high output powers, and if a transverse single-mode operation (TEM 00) is realized by the special, angle-selective gas-discharge tube, there will be available at the site of the Fabry-Perot interferometer arrangement a flat, monochromatic wave field, which is fed back more or less into the laser, depending on the set value of $R_2$. If $R_2$ is controlled to 0, the laser power becomes 0 when the operating threshold $R_s$ is not reached; on the other hand, if $R_2$ is controlled above the threshold $R_s$, the laser function starts, that is, the resonator shown can be actively Q-switched.

It is well known that the thermal load on the laser gas mixture can be reduced by means of the pulsed supply of pumping energy from high-power $CO_2$ lasers and that radiation pulses can be produced by these means, the peak power of which lies appreciably above the laser power achieved by supplying current continuously. The following working routine is required for the method of the invention of producing $CO_2$-laser high-power pulses.

While the generation of laser radiation is interrupted by means of the special interferometer arrangement (this means that $R_2 < R_s$), the active laser medium is brought by a current pulse into the state of maximum inversion. At the moment of maximum inversion, the total losses of the laser are suddenly decreased so far by means of the special interferometer arrangement, that the laser is above the threshold and emits radiation pulses of extremely high power magnification. The usual maximum frequencies of the current pulsation are of the order of 2.5 kHz. Since the special interferometer arrangement also permits this operating frequency, pulses up into this frequency range, the power magnification of which can be as high as several hundred, can be produced in the manner shown. An important characteristic of the solution of the invention is the realization of an accurately defined time delay between the high-voltage pumping pulse and the control pulse of the special interferometer arrangement by means of an appropriate electronic component. Such a procedure ensures that $R_2$, exceeds the threshold $R_s$, preferably at the very time when the maximum population inversion has been reached due to the pumping pulse.

With the described arrangement in accordance with the invention for generating $CO_2$-laser high-power pulses, the high gain of the active medium can become an appreciable problem for the operation of the method. If namely the described interferometer arrangement functions as an output coupling element of the laser with a variable degree of output coupling, then, according to the usual design principles for $CO_2$ lasers for material processing, the other resonator mirror would have to be totally reflecting, that is $R_1 \approx 1$. Under these conditions, however, the following difficulties arise. First of all, a $CO_2$ laser of, for example, 400W continuous output power, starts with a few percent feedback from the output coupling element, that is, employing a reasonable adjusting effort, it is extremely complicated to bring such an arrangement below the threshold. This, in turn, affects to a high degree the generation of greatly magnified pulses. The difficult adjustment problem in this connection is the requirement of adjusting the Fabry-Perot output-coupling element to a reflectivity of less than 1%. The second difficulty is caused by portions of the laser radiation reflected by the workpiece and travelling back into the laser resonator. Even if the power of this radiation amounts to only a few percent of the laser output power, the system may start even if the output coupling element is completely transparent. The resonator would then be formed by the 100% mirror on the one and the workpiece or the plasma in focus on the other side, and a pulsed operation, in the desired sense, would likewise hardly be possible.

These problems are solved in accordance with the invention owing to the fact that a reflectivity $R_1$ was chosen which is not approximately 1, but substantially less, which means that, first of all, this partially transparent mirror must comprise a transparent material, and, secondly, that radiation which can be utilized is coupled out at both ends of the resonator. If one is primarily interested in one main operating beam which suffers the least possible losses due to a basically unwanted "subsidiary beam", $R_1$ must be optimized in the following manner if, for example, the main portion of the laser radiation is to be coupled out over the resonator mirror with the fixed reflectivity $R_1$. For feasible interferometer arrangements, it may be assumed that $R_2$ varies in the interval $0 \leq R_2 \leq 09$. Pursuant to the invention, $R_1$ is now selected so that it is as small as possible, but at least large enough that the laser operates steadily when $R_2$ is sufficiently large and preferably greater than 0.5. Through the appropriate choice of $R_1$, first of all the total losses of the resonator can be dimensioned so that the laser threshold lies in a region which is totally noncritical for adjusting the interferometer, for example, at $R_2 \approx 0.3$, secondly, the power losses, arising from coupling out a second, weaker beam over the interferometer arrangement, become minimal and, thirdly, the whole of the resonator, when in the state of high total losses with $R_2 \approx 0$, that is, when in the switched-off state, is switched to all intents and purposes to transmit because of the small value of $R_1$, so that feedback effects due to radiation reflected from the workpiece are reduced to a minimum and the laser cannot be started in this state by reflections.

If the interferometer arrangement, adjusted to maximum transmission, and the laser radiation, reflected from the workpiece, do not cause an oscillation build-up in the laser, then the laser can be envisioned as a true "single-beam laser", owing to the fact that the first resonator mirror is constructed as a completely reflecting mirror with $R_1 \approx 1$.

An advantageous embodiment of the arrangement according to the invention for the generation of $CO_2$-laser high-power pulses is characterized by the fact that the frequency-selective element and the first resonator mirror with a fixed reflectivity $R_1$ are comprised as a functional unit of a prism which moreover preferably serves as the vacuum-tight termination of one end of the laser gas-discharge tube. The prism comprises a material transparent to the laser radiation of wavelength $\lambda$, for example, NaCl, has the refractive index $n(\lambda)$ and fulfills the following conditions:

1. The side of the uncoated prism directed towards the interior of the resonator forms the Brewster angle with the resonator axis. This means that the laser radiation, polarized in the incident plane, passes through this surface practically without reflection losses. The following equation applies for the angle $\alpha$ between the surface normal to the prism surface and the resonator axis:

$$\tan \alpha = n.$$

2. If the refracting angle $\epsilon$ of the prism is selected so that $$\epsilon = \arcsin\sqrt{\frac{1}{1+n^2}}$$

the side of the prism directed towards the outside is struck perpendicularly by the laser radiation and functions, corresponding to its reflectivity $R_1$, as a resonator mirror. Moreover, $R_1$, in conformity with the requirements set above for this quantity, may be determined either by the natural reflectivity of the prism material, by special coating systems or by blocking on suitable reflecting optics.

The invention will be described in greater detail below by means of an example of the operation.

BRIEF FIGURE DESCRIPTION

The accompanying drawings show the following:

DETAILED DESCRIPTION OF THE PREFERRED EMBODIMENT

Figure 1:
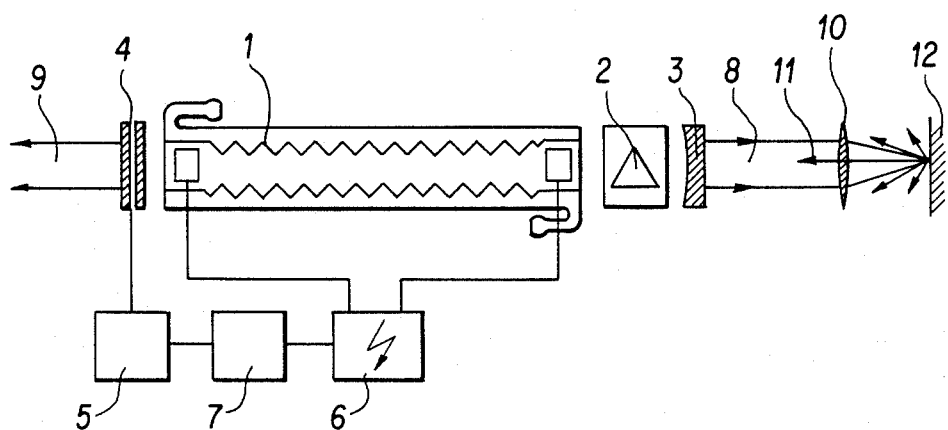
FIG. 1 shows the simplified sketch of the arrangement according to the invention.
Figure 3:
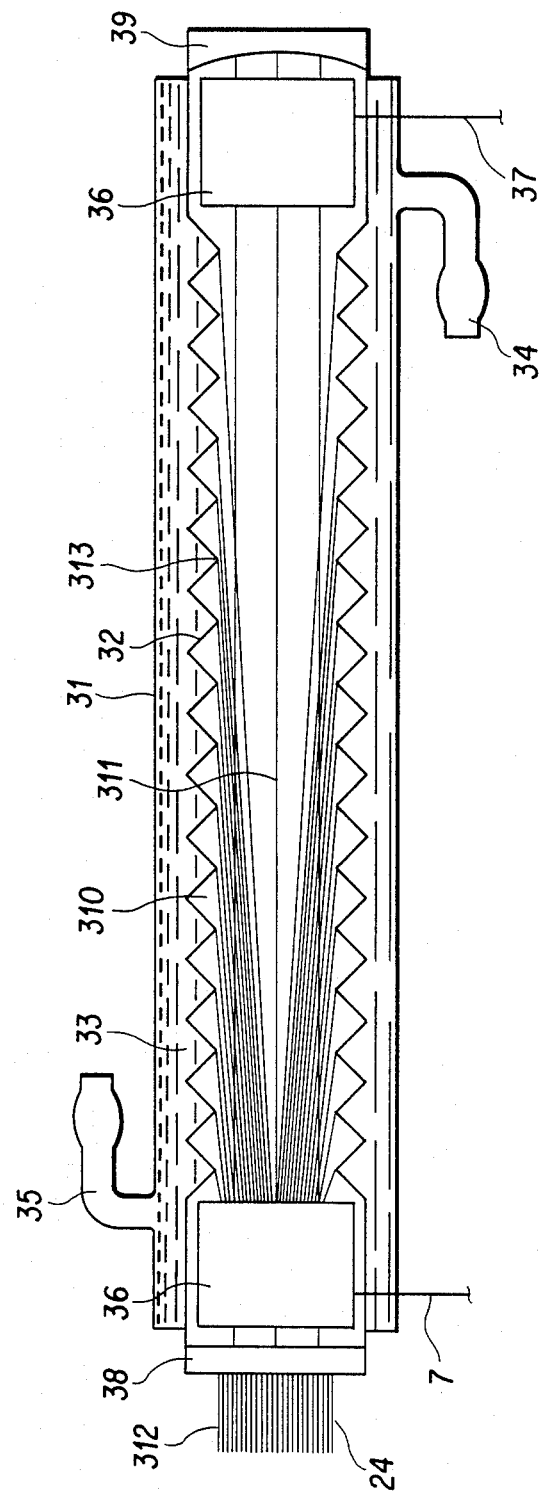
FIG. 3 is a diagram of a gas discharge tube used in the invention.

FIG. 1 illustrates the arrangement for the generation of $CO_2$-laser high-power pulses for processing materials. The special gas-discharge tube 1, which conforms to the disclosure of DDWP H 01 S/199 976 as shown in FIG. 3, which will be described later, and the frequency-selective element 2 ensure that the laser, with appropriate configuration of the resonator and especially with an internal diameter of the gas-discharge tube 1 appropriately matched to the radius of curvature of the resonator mirror 3, operates with the fixed reflectivity $R_1$ in the TEM 00 mode. In that case, the required flat and monochromatic wave field is available at the site of the special interferometer arrangement 4. The special interferometer arrangement 4 is formed preferably by the modulator disclosed in DD-WP H 01 S/264 005 6 and in corresponding U.S. patent application Ser. No. 739,577, filed May 30, 1985. As disclosed in this co-pending application, two plates of a transparent material are arranged parallel to one another, with the inner surfaces reflective and the outer surfaces dereflective. The two plates are mounted so that one of the plates is rigidly connected to a massive oscillation-resistant base comprising a strong permanent magnet. The other plate, together with a hollow cylinder fastened on an elastic membrane to form an oscillatable system, is driven by the electromagnetic interaction between the permanent magnet and a coil. The system is damped by the frictional force of a damping medium of high viscosity located in a gap between the stationary and oscillating sub-systems, so that a reproducible adjustment of the setting of the gap's width between the two plates is possible by control of the control current of the coil. The modulation of the laser beam power is accomplished in the manner described above by altering the reflectivity $R_2$ of this modulator by electrical control signals provided by the electrical control signal supply unit 5. As explained above, two output beams leave the laser, a relatively strong laser beam 8 and a relatively weak laser beam 9. Both can be utilized for the operating tasks. In the example shown in FIG. 1, a material processing task is carried out with the operating beam 8, which is focussed by lens 10 on the workpiece 12. As explained above, any radiation 11 reflected back eventually into the laser is harmless for the operation of the process.

The power for the gas discharge is supplied by a power supply unit 6, which permits the pulsed supply of pumping energy. The above-described necessary synchronization between the pumping pulse and the controlling pulse, made available by the electric supply unit 5, for the special interferometer arrangement 4, is accomplished with the help of the electric component 7. The electronic component 7 comprises a conventional circuit for synchronizing the controlling pulse of supply unit 5 with the pumping pulse.

Figure 2:
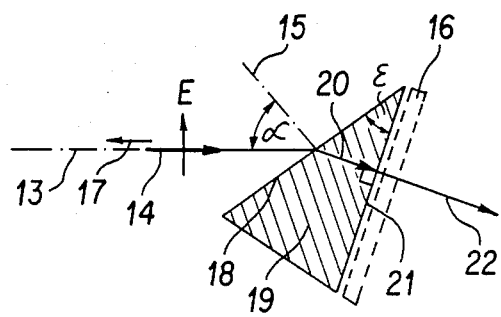
FIG. 2 shows the cross section of the mirror prism according to the invention.

FIG. 2 shows the course of the beam through the mirror prism 19 according to the invention, in which the frequency-selective element 2 and the resonator mirror 3 are combined and which makes possible an advantageous variation of the method described. The radiation, running parallel to the resonator axis 13 in the interior 14 of the resonator, is incident at the Brewster angle $\alpha$ on the uncoated side 18 of the prism 19 which is directed towards the interior of the resonator and, practically without losses and as the refracted beam 20, reaches the prism 19, which comprises the material, for example NaCl transparent to the laser radiation of wavelength $\lambda$ and having a refractive index $n(\lambda)$. The radiation is polarized in the plane of the drawing, as indicated by the position of the vector E in FIG. 2. If the angle of refraction $\epsilon$ of the prism is chosen appropriately, the beam 20 falls perpendicularly on the outwardly directed side 21 of the prism with the effective reflectivity $R_1$, $R_1$ being determined either by the natural reflectivity of the prism material, by special coating systems or by blocking on suitable reflecting optics 16. A portion 17 of this radiation is coupled back into the resonator, while the bulk leaves the prism and thus the laser as operating beam 22.

As seen in FIG. 3, the gas discharge tube 32, which belongs to a laser configuration that is not designated in greater detail, is a corrugated tube 313, which is formed by different geometric shapes, such as screw thread undercuts or ring-shaped grooves. The gas discharge tube 32 is cooled with coolant entering the coolant inlet 34 and leaving the coolant outlet 35. Over the total internal reflection optical element 39 and the decoupling element 38, the trouble-free mode-limited radiation field is formed along the gas discharge tube. In so doing, modes with excessive divergences 310, which are formed from unwanted diffuse radiation, are absorbed at the corrugated tube 313 and thus selected, so that only a continuous radiation 311 with small diffraction losses is produced. The voltage, necessary to ignite the gas discharge, is applied at the electrode connections 37 and the electrodes 36.

We claim:

1. In an arrangement for the generation of $CO_2$-laser high-power pulses, wherein
    power is supplied to a laser-gas discharge from a power supply unit, which permits the pulsed supply of pumping energy, the laser-gas discharge having an associated laser resonator, the improvement wherein the associated laser resonator is comprised of:
    a first resonator mirror with a fixed reflectivity $R_1$,
    a frequency-selective element,
    an angle-selective gas discharge tube, and a component of a material transparent to the laser radiation, said component functioning as a second resonator mirror with a variable reflectivity $R_2$ and being a modulator with a high cutoff frequency, said second resonator mirror comprising a Fabry-Perot interferometer with a rapidly changeable optical wavelength, the optical wavelength of said interferometer being alterable by control signals, whereby the reflectivity $R_2$ can be adjusted to a value between zero and a maximum and the value of $R_2$ is a function of the laser wavelength, whereby the laser resonator is forced by means of the frequency-selective and angle-selective elements to work at a specified, fixed wavelength, and the reflectivity $R_1$ of said first resonator mirror is sufficient to enable the laser to operate steadily when the variable reflectivity $R_2$ is large, and the total resonator losses can be varied rapidly by means of the variable reflectivity $R_2$ of the Fabry-Perot interferometer between a state in which the laser is below its operating threshold and a state with full laser function, and wherein a power supply for supplying electrical excitation energy of the gas discharge in pulsed fashion to the laser resonator synchronously with the electrical control signals of the interferometer with the variable reflectivity $R_2$, but with a precisely defined start in terms of time relative to them, whereby, with a minimum thermal load on the laser mixture, a maximum population inversion is attained at the moment at which the $CO_2$ laser exceeds its operating threshold due to the variable reflectivity $R_2$, so that radiation pulses of extremely high power magnification arise and leave the laser as operating beams.

2. The arrangement of claim 1, wherein the frequency selective element and the first resonator mirror are formed with a fixed reflectivity $R_1$ as a functional unit by a prism, said prism comprising a material with a refractive index $n(\lambda)$ transparent to the laser radiation of wavelength $\lambda$, said prism having an uncoated side directed towards the interior of the resonator that forms a Brewster angle with the resonator axis, the side of the prism directed outwardly of the arrangement being positioned to be struck perpendicularly by the laser radiation and, corresponding to its effective reflectivity $R_1$, act as a resonator mirror.

3. The arrangement of claim 1 wherein the variable reflectivity $R_2$ is greater than 0.5.

4. The arrangement of claim 1 wherein said fixed wavelength is optimum for high output power.

5. The arrangement of claim 2 wherein said prism serves as a vacuum tight termination of one end of the gas discharge tube of said laser.

6. The arrangement of claim 2 wherein $R_2$ is determined by the natural reflectivity of the prism material.

7. The arrangement of claim 2 wherein $R_2$ is determined by a coating on said prism.

* * * * *